April 17, 1962 J. A. BOMBARDIER 3,029,848
MACHINE FOR DELIMBING AND CUTTING TREES INTO LOGS
Filed Sept. 16, 1960 2 Sheets-Sheet 1
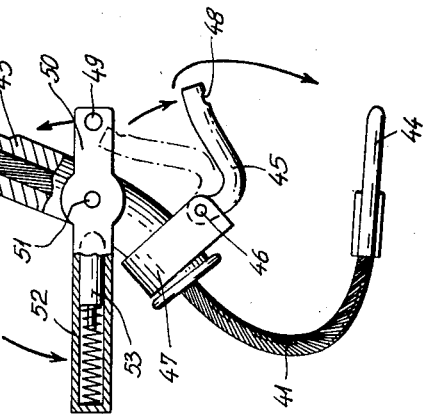
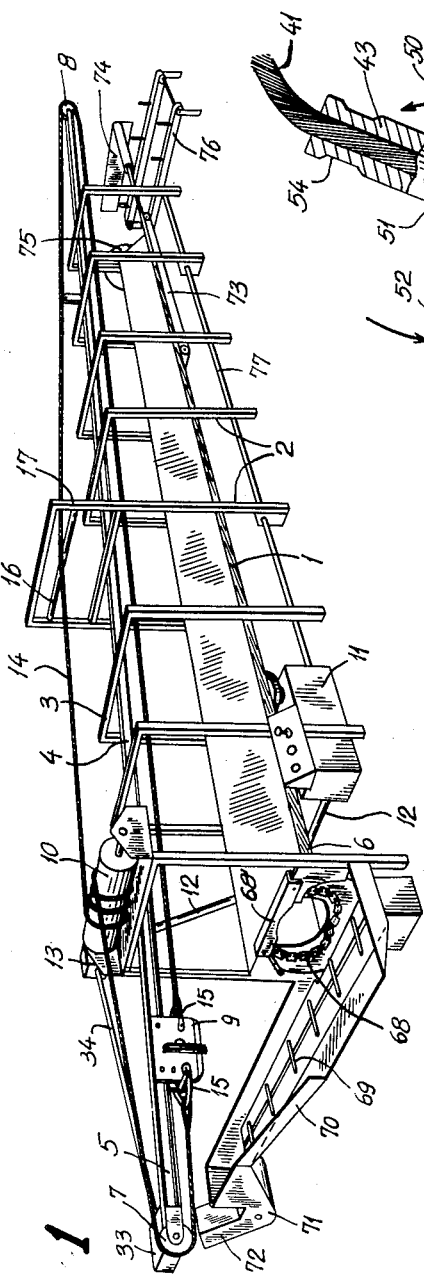
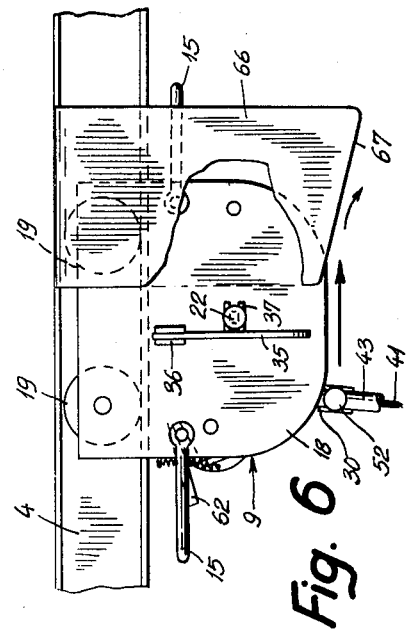
INVENTOR
Joseph Armand BOMBARDIER
BY
Pierre Lespérance
PATENT AGENT April 17, 1962  J. A. BOMBARDIER  3,029,848
MACHINE FOR DELIMBING AND CUTTING TREES INTO LOGS
Filed Sept. 16, 1960  2 Sheets-Sheet 2
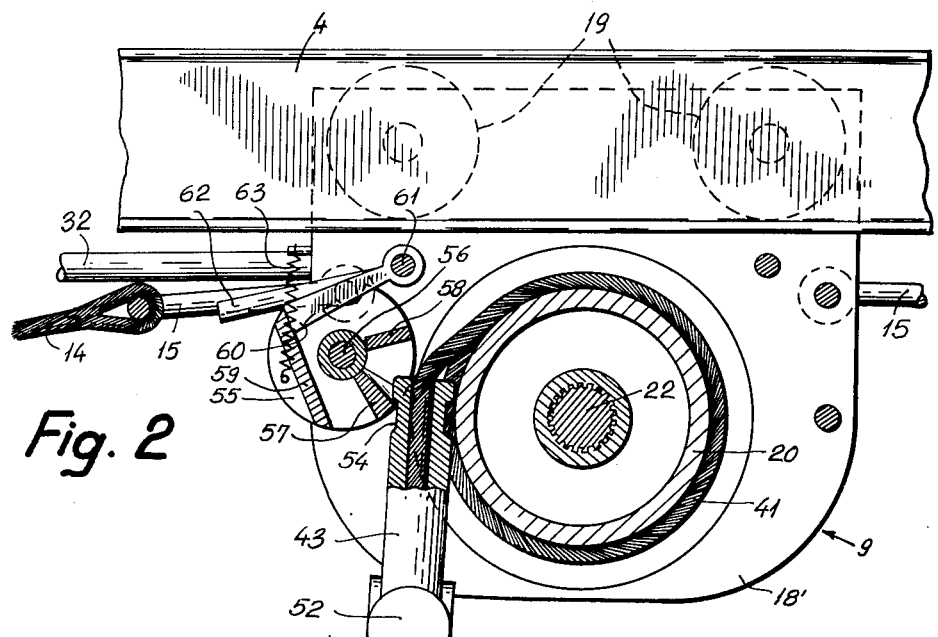
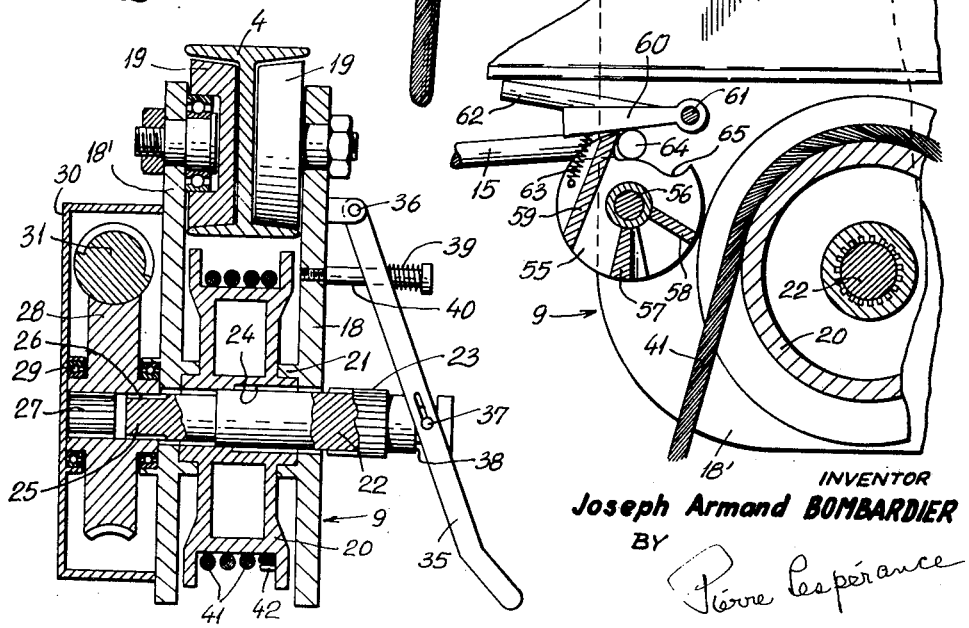
INVENTOR
Joseph Armand BOMBARDIER
BY
Pierre Lespérance
PATENT AGENT

United States Patent Office 3,029,848
Patented Apr. 17, 1962

3,029,848
MACHINE FOR DELIMBING AND CUTTING
TREES INTO LOGS
Joseph Armand Bombardier, Valcourt, Shefford County,
Quebec, Canada
Filed Sept. 16, 1960, Ser. No. 56,404
9 Claims. (Cl. 144—3)

The present invention relates to a new machine which is designed for delimbing whole trees and cutting the tree trunk into logs of standard length, for instance into pulp wood logs of four foot length.

The general object of the present invention resides in the provision of a machine of the character described in which the delimbing and cutting operations are nearly completely automatic and are effected in a very short time.

An important object of the present invention resides in the provision of a machine of the character described which is capable of delimbing trees of different lengths and diameter and which can be readily disassembled into sections in order to be transported from one site to another in the forest so as to be positioned as near as possible to the area where the trees are felled.

Yet another important object of the present invention is the provision of a machine of the character described having a great capacity and capable of resisting to the considerable forces produced during the delimbing operation.

Yet another object of the present invention resides in the provision of a machine of the character described having special means for pulling the tree through the delimbing jaws and for immediately transporting the tree trunk to the sawing station.

Yet another object of the present invention resides in the provision of a machine of the character described provided with means for discharging the cut branches and cutting the same into chips.

The foregoing and other important objects of the present invention will become more apparent during the following disclosure and by referring to the drawings in which:

FIGURE 1 is a perspective view on the entire machine in accordance with the invention;

FIGURE 2 is a longitudinal section of the trolley;

FIGURE 3 is a partial longitudinal section of the trolley in another position of its locking mechanism;

FIGURE 4 is a cross-section of the trolley;

FIGURE 5 is an elevation partially in section of the hooking means for maintaining the looped cable around the tree trunk; and FIGURE 6 is a side elevation of the trolley at the discharge end of its travel.

In the drawings, the same reference characters indicate the same elements throughout.

The machine in accordance with the invention consists essentially of a long trough at the front end of which are disposed pruning jaws built in accordance with a co-pending application Serial No. 45,375, filed July 26, 1960, now Patent No. 2,989,097, and entitled: "Tree Delimbing Jaws." by the same applicant. The downstream end of the trough is provided with a sawing assembly and means are provided for pulling the trees through the delimbing jaws along the trough and to finally bring the tree trunks to the sawing station. Thus, the machine in accordance with the present invention is capable of effecting the two operations of delimbing and cutting into standard length one after the other and without any additional handling of the tree.

In accordance with the invention, a trough 1 of generally V-shaped cross-section is horizontally disposed and has a length preferably equal to at least two times the maximum length of the trees to be delimbed and sawn by the machine. The trough 1 is preferably made of several sections and is supported by equally spaced upright frame members 2 which are detachably connected leg 3 of the other. The transverse upper horizontal leg 3 of the frames 2 supports a rail 4 consisting of an I-beam and which is horizontally disposed above the trough 1 and parallel to the same. Rail 4 has a front portion 5 which protrudes forwardly from the front or upstream end 6 of the trough 1. An idle pulley 7 is mounted at the front end of rail 4 and a further idle pulley 8 is mounted at the rear end of the rail 4. A trolley 9 is suspended from rail 4 and can move along the same. A winch drum 10 is transversely mounted on the front frame of the machine and over the rail 4 and is actuated in the two directions of rotation by means of an internal combustion engine mounted below the trough 1 and schematically indicated at 11, said engine being connected to the winch drum by means including the transmission shafts 12 and the transmission box 13 directly mounted at one end of the shaft of winch drum 10. A cable 14 is wound a few turns on winch drum 10, is trained on pulleys 7 and 8 and its ends are attached to opposite sides of the trolley 9 by means of pivoted yokes 15. A roller 16 is rotatably supported by upward extensions 17 of a frame 2 intermediate the ends of the trough 1 to support the cable 14 between the winch drum and the rear pulley 8.

The trolley 9 comprises two generally rectangular spaced parallel plates 18, 18' secured together and supporting at their upper marginal portion two pairs of opposed wheels 19 freely rotatably bearing on the lower flange of the I-beam rail 4. A flanged winch drum 20 is freely rotatably mounted in bearings 21 constituted by collars inwardly projecting from the plates 18, 18' and is disposed between the two plates. A shaft 22 is longitudinally slidable within the hub of winch drum 20 and has a male splined portion 23 engageable with the female splined portion 24 made at the interior surface of the hub of the winch drum for clutching engagement with the drum. The shaft 22 has a portion 25 of reduced diameter projecting outwardly from the plate 18' and having male splines 26 for clutching engagement with the female splines 27 made at the interior surface of the hub of a driving worm gear 28 which is journaled in bearings 29 mounted on the exterior of plate 18' and on a casing 30 secured to the outside of plate 18', and in which a worm 31 is journaled, said worm meshing with worm gear 28. Shaft 32 of the worm 31 projects forwardly of the trolley, a short distance and has a splined front end (not shown) adapted to enter within a power transmission box 33 secured to the front end of rail 4 (see FIGURE 1) for clutching engagement with a rotary member having female splines disposed within box 33 and driven by engine 11 through shaft 12, transmission box 13 and shaft 34. Thus, worm 31 and worm gear 28 are rotated by engine 11 only when the trolley is in its forward limit position with its shaft 32 in clutching engagement with the transmission box 33.

The spindle shaft 22 (see FIGURE 4) is longitudinally slidable outwardly from plate 18 by means of hand lever 35 pivoted to plate 18 at 36 and having a fork 37 slidably and pivotally mounted thereon and rotatably engaging groove 38 made in the outer end of shaft 22. Lever 35 is urged against plate 18 so as to move the spindle shaft 22 into clutching engagement with the worm gear 28 and the winch drum 20 by the spring 39 surrounding a bolt 40 freely passing through a hole made in lever 35. Spring 39 abuts against the head of the bolt 40 and against the lever on the outside thereof.

A lifting cable 41 is wound on winch drum 20 and has one end secured to said winch drum as shown at 42, in FIGURE 4. The cable 41 freely passes through a solid curved guiding sleeve 43 of generally circular cross section and the outer end of the cable is provided with an eye or loop 44 which is removably engageable by a bent hooking arm 45 (see FIGURE 5) which is pivoted at 46 to a strap 47 rigidly secured to the lower end of sleeve 43. The free end of arm 45 has a notch 48 engageable by a cross pin 49 which is secured across the outer ends of the prongs of a forked latching lever 50 pivoted at 51 on sleeve 43 intermediate the ends of lever 50. Latching lever 50 is provided with a tubular handle 52 causing a spring urged plunger 53 adapted to abut against the sleeve 43 so as to maintain the latching lever 50 in a position across sleeve so that its cross pin 49 will normally remain in engagement with the notch 48 of arm 45.

The upper end of sleeve 43 has a peripheral groove 54 for positively locking the sleeve 43 within the trolley 9. More particularly, a double flanged locking wheel 55 is rotatably mounted on a cross pin 56 secured to plates 18 and 18′ and is provided with two angularly spaced apart generally radial plates 57 and 58 extending between and secured to the two flanges of wheel 55. Opposed to the radial plates 57 and 58 is a third cross plate 59 secured also between and to the flanges of wheel 55. A latching lever 60 pivoted above wheel 55 on a cross pin 61 secured to and extending between the two plates 18 and 18′ is arranged to have its free end adapted to abut against the third plate 59 to prevent rotation of the wheel 55 in clockwise direction, as seen in FIGURE 2, so as to lock the plate 57 against downward movement when the latter extends towards the winch drum 20. The latching lever 60 is further provided with a forwardly directed actuating arm 62 which is also adapted to abut on the top edge of cross plate 59. A spring 63 is attached to one of the plates 18 or 18′ at its upper end and to the flanged wheel 55 at its lower end and urges this wheel in clockwise direction as seen in FIGURE 2.

Inwardly projecting studs 64, which are inward projections of the bolts pivotally attaching the front yoke 15 to the plates 18, 18′, engage the cut out portions 65 of the two flanges of the double flanged wheel 55 so as to limit the angular extent of rotation of said wheel 55.

Near the rear end portion of the rail 4, a downwardly extending release plate 66 (see FIGURE 6) is secured to said rail 4 and has a lower inclined edge 57 disposed in the path of the handle 52 of the latching lever 50 mounted on sleeve 43 so as to pivot said latching lever 50 to release the hooking arm 45.

The machine of the invention is further provided at the front end of the trough 1, forwardly of the delimbing jaws 68, the operation and construction of which are described in the above named co-pending application, with a transversely extending conveyor 69 moving in a tapered guiding trough 70 whereby the cut branches are moved laterally of the machine and into a chipper of the rotary type housed in casing 71 whereby the branches are cut into small pieces and blown by upwardly directed discharge duct 72.

At the rear end of the trough 1 is a conveyor 73 for longitudinally moving the tree trunks at the bottom of the trough 1 against an abutment plate 74 transversely extending across the rear end of the trough and spaced therefrom. The tree trunk is stopped by said plate 74 whereby the circular saw 75 may be moved across the end of the trough 1 to cut the tree trunk into a standard length and the cut log is then dropped onto a transversely extending conveyor 76 to be discharged laterally of the machine. The saw is operated by engine 11 through shaft 77 extending below and along the trough 1. Similarly, conveyor 76 is actuated by shaft 77. Plate 74 may be moved rearwardly to release the tree trunk for ease in sawing, once the tree is in proper sawing position.

The machine in accordance with the invention operates as follows: The winch drum 10 is operated by engine 11 through suitable controls to move trolley 9 by cable 14 forwardly along rail 4 until said trolley takes a forward limit position with its driving shaft 32 becoming inserted within transmission box 33 and in driving engagement therein. The operator at the front of the machine then releases the sleeve 43 by pushing upwardly against the arm 62 of latching lever 60 which in turn clears the plate 59 of the locking wheel 55 and allows clockwise rotation of the latter, whereby the plate 57 clears the groove 54 of the sleeve 43 and the latter then drops under its own weight and pulls the cable 41 which unwinds from the winch drum 20 of the trolley, the clutching shaft 22 of said trolley being maintained by the operator in declutched position, as shown in FIGURE 4, the operating lever 35 having been moved outwardly of the trolley. The outer end of the cable 41 issuing from the lower end of sleeve 43 is then positioned by the operator around the big end of a tree lying at the front of the machine. The operator then hooks the eye 44 on arm 45 and locks this arm 45 by means of the latching lever 50. The operator at the controls of the engine 11 then causes the actuation of shaft 34 and transmission box 33 which drives the shaft 32, worm 31, worm gear 28 and spindle shaft 22 of the trolley 9, said shaft 22 being in clutching engagement with worm gear 28 and with the winch drum 20 due to the previous release of hand lever 35; the winch drum 20 now winds the cable 41 which slides in sleeve 43 and causes tightening of the looped portion of the cable 41 surrounding the tree trunk. The tree trunk and sleeve 43 are raised towards the trolley 9 until the upper end of the sleeve 43 abuts against plate 58 of the double flanged wheel 55, the latter being in released position (shown in FIGURE 3). Further upward movement of sleeve 43 causes anticlockwise rotation of locking wheel 55 until third plate 59 clears the latching lever 60 and the latter drops at the back of said plate 59 under its own weight and is retained in latching engagement therewith due to the arm 62 resting on the top edge of plate 59. Thus, the sleeve 43 becomes locked in elevated position by engaging the wound portion of the cable 41 on the winch drum 20 and by having its groove 54 engaged by the locking plate 57 of wheel 55. The sleeve is prevented from moving further upwardly under rotation of the winch drum 20 because it abuts plate 58 and further anticlockwise rotation of the flanged wheel 55 is prevented by the studs 64 abutting against one end of the cut out portion 65 of the flanges of wheel 55. Under these conditions, the engine 11 tends to stall and the operator of the engine immediately declutches the transmission of power to the worm 31 of the trolley. He then operates the trolley rearwardly along the rail 4, thereby declutching the worm shaft 32 from transmission box 33. However, the winch drum 20 does not tend to unwind under the weight of the tree due to the locking action between the worm 31 and worm gear 28. The tree trunk is maintained by the sleeve 43 at the level of the delimbing jaws 68, the top plate 68′ of which being now opened for the passage of the attached big end of the tree trunk; said top plate is immediately closed after said passage, the trolley 9 continues its rearward movement along the rail 4 to thereby pull the tree through the delimbing jaws 68 while the latter are forced against the periphery of the tree trunk to cut out the branches and even remove the bark. The cut branches and bark pieces fall onto lateral trough 70 and are moved by conveyor 69 into casing 71 where they are chipped and the chips are blown through duct 72.

During pulling of the tree through the delimbing jaws, a great pulling force has to be exerted. However, the major portion of this force is directly resisted by the sleeve 43 which is locked in elevated position as shown in FIGURE 2, rather than by cable 41 which is free of excessive stresses. The locked sleeve 43 also maintains the tree trunk in proper alignment with the delimbing jaws. When the tree has been completely delimbed, the rearwardly moving trolley 9 finally reaches the releasing plate 66 which abuts against the laterally directed handle 52 of the latching lever 50 and causes pivotal movement of said latching member to thereby release the hooking arm 45 which in turn clears the eye 44 whereby cable 41 releases the delimbed tree trunk which falls onto the rear conveyor 73 and is moved rearwardly within trough 1 until its rear end abuts abutment plate 74. The operator of saw 75 then cuts the tree trunk into standard lengths and the resulting logs are conveyed laterally out of the machine by conveyor 76. As soon as the delimbed tree trunk has been released from trolley 9, the latter is moved forwardly towards the front end of rail 4 to repeat the cycle of operations on another tree. The length of the trough 1 is such that it can carry two trees in end to end relation; thus one tree is pruned while the other is being sawn into logs.

While a preferred embodiment in accordance with the present invention has been illustrated and described, it is understood that various modifications may be resorted to without departing from the spirit and scope of the appended claims.

What I claim is:

1. An apparatus for delimbing trees and cutting the same into logs comprising, in combination, a framework, a trough supported by said framework for slidably receiving tree trunks longitudinally moved therealong, delimbing jaws mounted at the front end of said trough, tree trunks sawing means mounted at the rear end of said trough, rail means mounted above said framework and extending forwardly of said delimbing jaws, power operated trolley means movable along said rail means to a point forwardly of said delimbing jaws, and attachable to a tree for suspending and pulling the tree through said delimbing jaws for delimbing the tree and for moving the tree trunk along said trough to a point close to said sawing means.

2. An apparatus for delimbing trees and cutting the same into logs comprising, in combination, a framework, a trough supported by said framework for slidably receiving tree trunks longitudinally moved therealong, delimbing jaws mounted at the front end of said trough, tree trunks sawing means mounted at the rear end of said trough, rail means mounted above said framework and extending forwardly of said delimbing jaws, power operated trolley means movable along said rail means to a point forwardly of said delimbing jaws, and attachable to a tree for suspending and pulling the tree through said delimbing jaws for delimbing the tree and for moving the tree trunk along said trough to a point close to said sawing means, said trough being of a length sufficient to receive at least two tree trunks in end to end relationship whereby one tree can be delimbed while the other is being sawn into logs.

3. An apparatus for delimbing trees and cutting the same into logs comprising, in combination, a framework, a trough supported by said framework for slidably receiving tree trunks longitudinally moved therealong, delimbing jaws mounted at the front end of said trough, tree trunks sawing means mounted at the rear end of said trough, rail means mounted above said framework and extending forwardly of said delimbing jaws, power operated trolley means movable along said rail means to a point forwardly of said delimbing jaws, and attachable to a tree for suspending and pulling the tree through said delimbing jaws for delimbing the tree and for moving the tree trunk along said trough to a point close to said sawing means, and conveyor means mounted in the bottom of the rear end portion of said trough for engaging and moving a tree trunk along said trough to a point past said sawing means.

4. An apparatus for delimbing trees and cutting the same into logs comprising, in combination, a framework, a trough supported by said framework for slidably receiving tree trunks longitudinally moved therealong, delimbing jaws mounted at the front end of said trough, tree trunks sawing means mounted at the rear end of said trough, rail means mounted above said framework and extending forwardly of said delimbing jaws, power operated trolley means movable along said rail means to a point forwardly of said delimbing jaws, and attachable to a tree for suspending and pulling the tree through said delimbing jaws for delimbing the tree and for moving the tree trunk along said trough to a point close to said sawing means, and means for attaching a tree to said trolley including a winch drum mounted in said trolley, a cable wound on said winch drum, a curved sleeve through which said cable passes, hooking means between said sleeve and the outer end of said cable for attaching said cable to said sleeve, and means for locking said sleeve in elevated position directly to said trolley.

5. An apparatus for delimbing trees and cutting the same into logs comprising, in combination, a framework, a trough supported by said framework for slidably receiving tree trunks longitudinally moved therealong, delimbing jaws mounted at the front end of said trough, tree trunks sawing means mounted at the rear end of said trough, rail means mounted above said framework and extending forwardly of said delimbing jaws, power operated trolley means movable along said rail means to a point forwardly of said delimbing jaws, and attachable to a tree for suspending and pulling the tree through said delimbing jaws for delimbing the tree and for moving the tree trunk along said trough to a point close to said sawing means, means for attaching a tree to said trolley including a winch drum mounted in said trolley, a cable wound on said winch drum, a curved sleeve through which said cable passes, hooking means between said sleeve and the outer end of said cable for attaching said cable to said sleeve, means for locking said sleeve in elevated position directly to said trolley, and means for driving said winch drum including a shaft projecting forwardly of said trolley and removably engageable with transmission means mounted at the front end of said rail.

6. An apparatus for delimbing trees and cutting the same into logs comprising, in combination, a framework, a trough supported by said framework for slidably receiving tree trunks longitudinally moved therealong, delimbing jaws mounted at the front end of said trough, tree trunks sawing means mounted at the rear end of said trough, rail means mounted above said framework and extending forwardly of said delimbing jaws, power operated trolley means movable along said rail means to a point forwardly of said delimbing jaws, and attachable to a tree for suspending and pulling the tree through said delimbing jaws for delimbing the tree and for moving the tree trunk along said trough to a point close to said sawing means, means for attaching a tree to said trolley including a winch drum mounted in said trolley, a cable wound on said winch drum, a curved sleeve through which said cable passes, hooking means between said sleeve and the outer end of said cable for attaching said cable to said sleeve, means for locking said sleeve in elevated position directly to said trolley, said hooking means including a laterally extending latching member pivotally mounted on said sleeve, a release plate mounted on said rail at the rear end thereof and adapted to abut said handle when said trolley reaches the rear end of said rail to thereby release said hooking means and the tree trunk held by said cable.

7. An apparatus for delimbing trees and cutting the same into logs comprising, in combination, a framework, a trough supported by said framework for slidably receiving tree trunks longitudinally moved therealong, delimbing jaws mounted at the front end of said trough, tree trunks sawing means mounted at the rear end of said trough, rail means mounted above said framework and extending forwardly of said delimbing jaws, power operated trolley means movable along said rail means to a point forwardly of said delimbing jaws, and attachable to a tree for suspending and pulling the tree through said delimbing jaws for delimbing the tree and for removing the tree trunk along said trough to a point close to said sawing means, said sawing means including an abutment plate disposed transversely across the rear end of said trough for abutting a tree trunk, a saw mounted for displacement across the rear end of said trough and conveyor means for moving the cut logs laterally outwardly of the trough.

8. An apparatus for delimbing trees and cutting the same into logs comprising, in combination, a framework, a trough supported by said framework for slidably receiving tree trunks longitudinally moved therealong, delimbing jaws mounted at the front end of said trough, tree trunks sawing means mounted at the rear end of said trough, rail means mounted above said framework and extending forwardly of said delimbing jaws, power operated trolley means movable along said rail means to a point forwardly of said delimbing jaws, and attachable to a tree for suspending and pulling the tree through said delimbing jaws for delimbing the tree and for moving the tree trunk along said trough to a point close to said sawing means, and means at the front of the delimbing jaws for moving the cut branches laterally out of the trough and for cutting down the branches into chips.

9. An apparatus for delimbing trees and cutting the same into logs comprising, in combination, a framework, a trough supported by said framework for slidably receiving tree trunks longitudinally moved therealong, delimbing jaws mounted at the front end of said trough, tree trunks sawing means mounted at the rear end of said trough, rails means mounted above said framework and extending forwardly of said delimbing jaws, power operated trolley means movable along said rail means to a point forwardly of said delimbing jaws, and attachable to a tree for suspending and pulling the tree through said delimbing jaws for delimbing the tree and for moving the tree trunk along said trough to a point close to said sawing means, means for attaching a tree to said trolley including a winch drum mounted in said trolley, a cable wound on said winch drum, a curved sleeve through which said cable passes, hooking means between said sleeve and the outer end of said cable for attaching said cable to said sleeve, means for locking said sleeve in elevated position directly to said trolley, said locking means including a blade movable into engagement with a peripheral groove made at the upper end of said sleeve for pressing said sleeve against said drum, and a releasable latching member to lock said blade into sleeve groove engaging position.

References Cited in the file of this patent

UNITED STATES PATENTS

| | | |
|---|---|---|
| 1,835,376 | Cherney | Dec. 8, 1931 |
| 2,760,534 | Hansel | Aug. 28, 1956 |
| 2,841,195 | Fulghum | July 1, 1958 |
| 2,882,941 | Pope | Apr. 21, 1959 |